(12) United States Patent
Atkinson

(10) Patent No.: US 6,961,476 B2
(45) Date of Patent: Nov. 1, 2005

(54) AUTOTHRESHOLDING OF NOISY IMAGES

(75) Inventor: Matthew Robert Cole Atkinson, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 665 days.

(21) Appl. No.: 09/917,545

(22) Filed: Jul. 27, 2001

(65) Prior Publication Data

US 2003/0025942 A1 Feb. 6, 2003

(51) Int. Cl.$^7$ ................................................. G06T 1/00
(52) U.S. Cl. ..................................... 382/272; 382/271
(58) Field of Search ................................ 382/203, 270, 382/271, 272

(56) References Cited

U.S. PATENT DOCUMENTS

| | | | | |
|---|---|---|---|---|
| 5,048,096 A | * | 9/1991 | Beato | 382/176 |
| 5,506,917 A | * | 4/1996 | Ito et al. | 382/271 |
| 5,805,723 A | * | 9/1998 | Fujiwara | 382/172 |
| 5,832,111 A | | 11/1998 | Florent | 382/171 |
| 5,900,949 A | | 5/1999 | Sampas | 358/483 |
| 5,943,448 A | | 8/1999 | Tatsuta | 382/270 |
| 6,075,574 A | * | 6/2000 | Callway | 348/673 |
| 6,199,986 B1 | | 3/2001 | Williams et al. | 351/227 |
| 6,229,875 B1 | * | 5/2001 | Keesmaat | 378/98.7 |

FOREIGN PATENT DOCUMENTS

| | | | |
|---|---|---|---|
| EP | 0 176 910 A | 4/1986 | G06K/9/32 |
| EP | 0 617 380 A | 9/1994 | G06K/9/64 |
| GB | 2 294 319 A | 4/1996 | G06T/7/60 |
| WO | WO 00/04497 | 1/2000 | G06T/5/00 |

OTHER PUBLICATIONS

Russ, John C., The Image Processing Handbook, 2nd ed., CRC Press 1995, pp. 394–396 and pp. 416–418.

Farrow, G. S. D. et al., "Detecting The Skew Angle In Document Images", *Signal Processing, Image Communication*, NL, Elsevier Science Publishers, Amsterdam, vol. 6, No. 2, May 1, 1994, pp. 101–114.

(Continued)

*Primary Examiner*—Bhavesh M. Mehta
*Assistant Examiner*—Dennis Rosario-Vasquez
(74) *Attorney, Agent, or Firm*—Philip Y. Dahl

(57) ABSTRACT

The present invention provides to image processing methods that include a method of selecting an optimal threshold value ($t_o$) for an image comprising the steps of: obtaining an image; selecting a test segment of the said image; determining the mean feature size (S) of features appearing in the test segment at each of a plurality of threshold values (t), so as to produce mean feature size data (S(t)); selecting a relevant subset of the mean feature size data (S(t)); and determining an optimal threshold value ($t_o$) as a function of said subset of the mean feature size data. The present invention additionally provides methods of thresholding an image to produce a binary image by application of the optimal threshold value ($t_o$) determined according to the methods of the present invention.

75 Claims, 9 Drawing Sheets

OTHER PUBLICATIONS

Yu, B. et al., "A Robust And Fast Skew Detection Algorithm For Generic Documents", *Pattern Recognition, US, Pergamon Press Inc., Elmsford, NY*, vol. 29, No. 10, Oct. 1, 1996, pp. 1599–1629.

Srihari, et al., "Analysis Of Textual Images Using The Hough Transform", *Machine Vision and Application, DE Springer Verlag*, vol. 2, No. 2, 1989, pp. 141–153.

Baird, Henry S., "The Skew Angle of Printed Documents", Symposium On Hydrid Imaging, 1987, pp. 21–24.

Yibing Yang et al; "*An Adaptive Logical Method For Binarization Of Degraded Document Images*", Pattern Recognition, May 2000, Elsevier, U.K. vol. 33, No. 5, pp. 787–807.

Di Ruberto C, et al; "*Morphological Image Processing For Evaluating Malaria Disease*", Visual Form 2001, 4$^{th}$ International Workshop on Visual Form IWVF4. Proceedings (Lecture notes in computer science vol. 2059), Visual Form 2001, 4$^{th}$ International Workshop, Capri, Italy, May 28–30, 2001, pp. 739–748.

Otsu N; "*A Threshold Selection Method From Gray–Level Histograms*", IEEE Transactions on Systems, Man, and Cybernetics, IEEE, New York, NY, vol. 9, No. 1, Jan. 1979, pp. 62–66.

* cited by examiner

AUTOTHRESHOLDING OF NOISY IMAGES

FIELD OF THE INVENTION

This invention relates to automatizable methods of image processing which include a method of selecting an optimal threshold value ($t_o$) for an image, where the optimal threshold value ($t_o$) is selected as a function of mean feature size data (S(t)) representing the mean feature size (S) of features detected in the image at each of a plurality of threshold values (t). The optimal threshold value ($t_o$) so determined may be used to threshold the image to produce a low-noise binary image.

BACKGROUND OF THE INVENTION

In general, it is known to derive a binary (two-tone) image from a multi-tone image by a process of "thresholding." In thresholding, pixels or picture elements of the image are assigned one of two tones (e.g., black or white), based on a determination of whether the initial tone of the pixel or picture element (e.g., a shade of gray) is above or below a chosen threshold (e.g., a chosen level of brightness).

Co-pending applications U.S. Ser. No. 09/422,584, filed Oct. 21, 1999, and U.S. Ser. No. 09/422,535, filed Oct. 21, 1999, disclose that features of interest within an image may be identified by thresholding.

U.S. Pat. No. 5,832,111 concerns a method for thresholding a video signal to produce a binary segmented video signal.

U.S. Pat. No. 6,199,986 concerns an automated method for measuring the wavefront aberration of an eye.

John C. Russ, *The Image Processing Handbook*, 2d ed. (CRC Press 1995) at pages 394–96 and 416–18, describes feature detection in a digitized image.

SUMMARY OF THE INVENTION

Briefly, the present invention provides an automatizable method of selecting an optimal threshold value ($t_o$) for an image comprising the steps of: obtaining an image; selecting a test segment of the image; determining the mean feature size (S) of features appearing in the test segment at each of a plurality of threshold values (t), so as to produce mean feature size data (S(t)); selecting a relevant subset of the mean feature size data (S(t)); and determining an optimal threshold value ($t_o$) as a function of the relevant subset of the mean feature size data. Typically, the optimal threshold value ($t_o$) is determined to be a threshold value equal to or approximating a midpoint of the relevant subset of mean feature size data. More typically, the optimal threshold value ($t_o$) is taken as the weighted average threshold value (t) appearing in the relevant subset of mean feature size data, weighted according to mean feature size (S(t)). Typically, the relevant subset is determined so as to exclude a low threshold saturation plateau in the mean feature size data. This may be accomplished by excluding values for which S(t) is greater than a given percentage of the maximum value of S observed in the mean feature size data ($S_{max}$), which may be between 1% and 100% and is typically 1%. Alternately, and more typically, counting data (N(t)) is produced by counting the number of features (N) appearing in the test segment of the image at each of a plurality of threshold values (t) and the relevant subset of the mean feature size data (S(t)) is selected as a function of the counting data (N(t)). Typically, a cutoff threshold value ($t_c$) is determined from the counting data (N(t)) and used to determine the relevant subset of the mean feature size data (S(t)). The relevant subset of the mean feature size data (S(t)) is selected by including all values for which $t > t_c$ or all values for which $t \geq t_c$. Typically, the cutoff threshold value ($t_c$) is determined as a function of the counting data (N(t)), which function provides a cutoff threshold value ($t_c$) that falls in a transition range between an early noise peak of the counting data (N(t)) and a following low-slope region. Typically, the cutoff threshold value ($t_c$) is determined by a function $t_c = 2t_{P\%} - t_{Q\%}$; wherein $t_{P\%}$ is the lowest value of t for which N(t) has not exceeded P% of the maximum value of N observed in the counting data ($N_{max}$), wherein $t_{Q\%}$ is the lowest value of t for which N(t) has not exceeded Q% of the maximum value of N observed in the counting data ($N_{max}$), wherein $P\% \geq Q\%$, and wherein P% and Q% are independently selected from numbers between 1% and 100%. More typically, P% is selected from numbers between 50% and 95% and Q% is selected from numbers between 5% and 95%.

In another aspect, the present invention provides an automatizable method of thresholding an image including any of the methods disclosed herein for choosing an optimal threshold value ($t_o$) for the image.

In another aspect, the present invention provides a system for determining an optimal threshold value ($t_o$) for an image, comprising: a) an image device for providing a digitized image; b) a data storage device; and c) a central processing unit for receiving the digitized image from the image device and which can write to and read from the data storage device, where the central processing unit is programmed to perform a method disclosed herein for selecting an optimal threshold value ($t_o$) for the image.

In another aspect, the present invention provides a system for thresholding an image, comprising: a) an image device for providing a digitized image; b) a data storage device; and c) a central processing unit for receiving the digitized image from the image device and which can write to and read from the data storage device, where the central processing unit is programmed to perform a method disclosed herein for thresholding an image.

In another aspect, the present invention provides data storage media having recorded thereon software that upon installation in a computer and execution of the software will cause the computer to carry out a method disclosed herein for selecting an optimal threshold value ($t_o$) for the image.

In another aspect, the present invention provides data storage media having recorded thereon software that upon installation in a computer and execution of the software will cause the computer to carry out a method disclosed herein for thresholding an image.

What has not been described in the art, and is provided by the present invention, is an automatizable method to select an optimal threshold value ($t_o$) for an image which minimizes noise artifacts by choosing to as a function of mean feature size data (S(t)).

In this application:

"Binary image" means an image in two tones or values, e.g. black and white, essentially without any intermediate values, e.g. gray shades. In the case of a digital image, all intermediate values are typically excluded, whereas total exclusion of intermediate values may not be possible in a photochemical image.

"Feature" means a group of contiguous pixels or picture elements having similar values. Contiguous pixels or picture elements may be defined in any suitable manner. Contiguous pixels or picture elements may include only those sharing an edge (four-connected rule) or may more typically include those sharing an edge or a corner (eight-connected rule). Alternately, contiguous pixels or picture elements may be defined as those which can be connected by a straight line segment that does not pass through any third pixel or picture element. For a binary image, pixels or picture elements having similar values are pixels or picture elements having essentially the same value. Typically, one value is designated a background value and "features" of that value are excluded.

"Test segment" means, with regard to an image, a portion of the image chosen to be tested, which may include up to 100% of the image.

"Mean feature size" means the average size of a collection of features, typically expressed as area size, number of pixels or picture elements, or similar measures.

It is an advantage of the present invention to provide a method of thresholding an image which may be automated, which excludes noise, and which provides accurate feature detection.

BRIEF DESCRIPTION OF THE DRAWING

FIG. 7 represents the product of the thresholding method according to the present invention.

DETAILED DESCRIPTION OF PREFERRED EMBODIMENTS

The present invention provides image processing methods that include a method of selecting an optimal threshold value ($t_o$) for an image comprising the steps of: obtaining an image; selecting a test segment of the said image; determining the mean feature size (S) of features appearing in the test segment at each of a plurality of threshold values (t), so as to produce mean feature size data (S(t)); selecting a relevant subset of the mean feature size data (S(t)); and determining an optimal threshold value ($t_o$) as a function of said subset of the mean feature size data.

The step of obtaining an image may be accomplished by any suitable method. The image may be collected by use of a video camera, digital camera, photochemical camera, microscope, visual scanning system, probe scanning system, or other sensing apparatus which produces data points in a two-dimensional array. Typically, the target image is expected to be essentially a binary image containing distinct features, which, however, may additionally contain noise. If the image is not initially created in digital form by the image capturing or creating equipment, the image is typically digitized into pixels. Typically, the methods described herein are accomplished with use of a central processing unit or computer.

Figure 1:
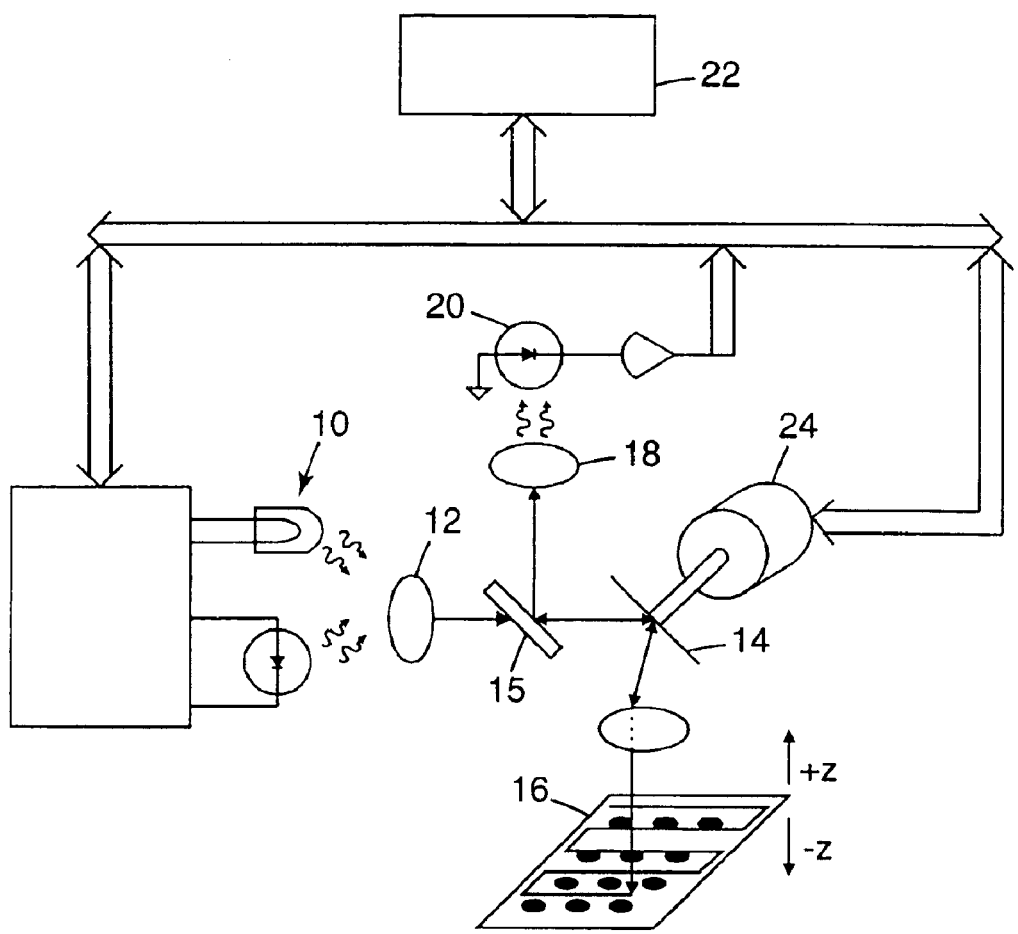
FIG. 1 is a schematic illustration of a prototypical scanning system with which the present invention might be used.

FIG. 1 illustrates a scanning system with which the present invention might be used. In the system of FIG. 1, a focused beam of light moves across an object and the system detects the resultant reflected or fluorescent light. To do this, light from a light source 10 is focused through source optics 12 and deflected by mirror 14 onto the object, shown here as a sample 3×4 assay plate 16. The light from the light source 10 can be directed to different locations on the sample by changing the position of the mirror 14 using motor 24. Light that fluoresces or is reflected from sample 16 returns to detection optics 18 via mirror 15, which typically is a half silvered mirror. Alternatively, the light source can be applied centrally, and the emitted or fluoresced light can be detected from the side of the system, as shown in U.S. Pat. No. 5,900,949, or the light source can be applied from the side of the system and the emitted or fluoresced light can be detected centrally, or any other similar variation. Light passing through detection optics 18 is detected using any suitable image capture system 20, such as a television camera, CCD, laser reflective system, photomultiplier tube, avalanche photodiode, photodiodes or single photon counting modules, the output from which is provided to a computer 22 programmed for analysis and to control the overall system. Computer 22 typically will include a central processing unit for executing programs and systems such as RAM, hard drives or the like for data storage. It will be understood that this description is for exemplary purposes only; the present invention can be used equally well with "simulated" images generated from magnetic or tactile sensors, not just with light-based images, and with any object to be examined, not just sample 16.

In the step of selecting a test segment of the image, typically a test segment will be sought which is representative of the entire image. A test segment may be selected for each new image separately or a fixed test segment area may be used for each of a number of images. In an automated system, the test segment is typically predetermined and the same segment area is used for all images processed. The test segment may contain up to 100% of the image. For ease of computation, the test segment may contain less than all of the image. If the test image is expected to contain particular features, the test segment typically contains at least one expected feature and more typically four or more.

To produce mean feature size data (S(t)), the mean feature size (S) of features appearing in the test segment is determined at each of a plurality of threshold values (t). As noted above, "features" may be defined in a number of ways. Typically the eight-connected rule is used. The same definition is typically used throughout the process. Features touching the border of the test segment may be included or excluded. Features touching the border of the test segment that are included may be included in their entire size or only in the portion falling within the test segment. The same rule regarding features touching the border is typically used throughout the process. Typically, features touching the border of the test segment are included in the test segment but only in the portion falling within the test segment. Mean feature size data (S(t)) may be calculated for all of the available values of t; which may be 256 values in a digital image. If fewer values are used, calculation time may be improved at the expense of precision in determining the best optimal threshold value ($t_o$). Typically, mean feature size data (S(t)) is calculated for every forth value of t in a digital image having 256 possible values.

Figure 2:
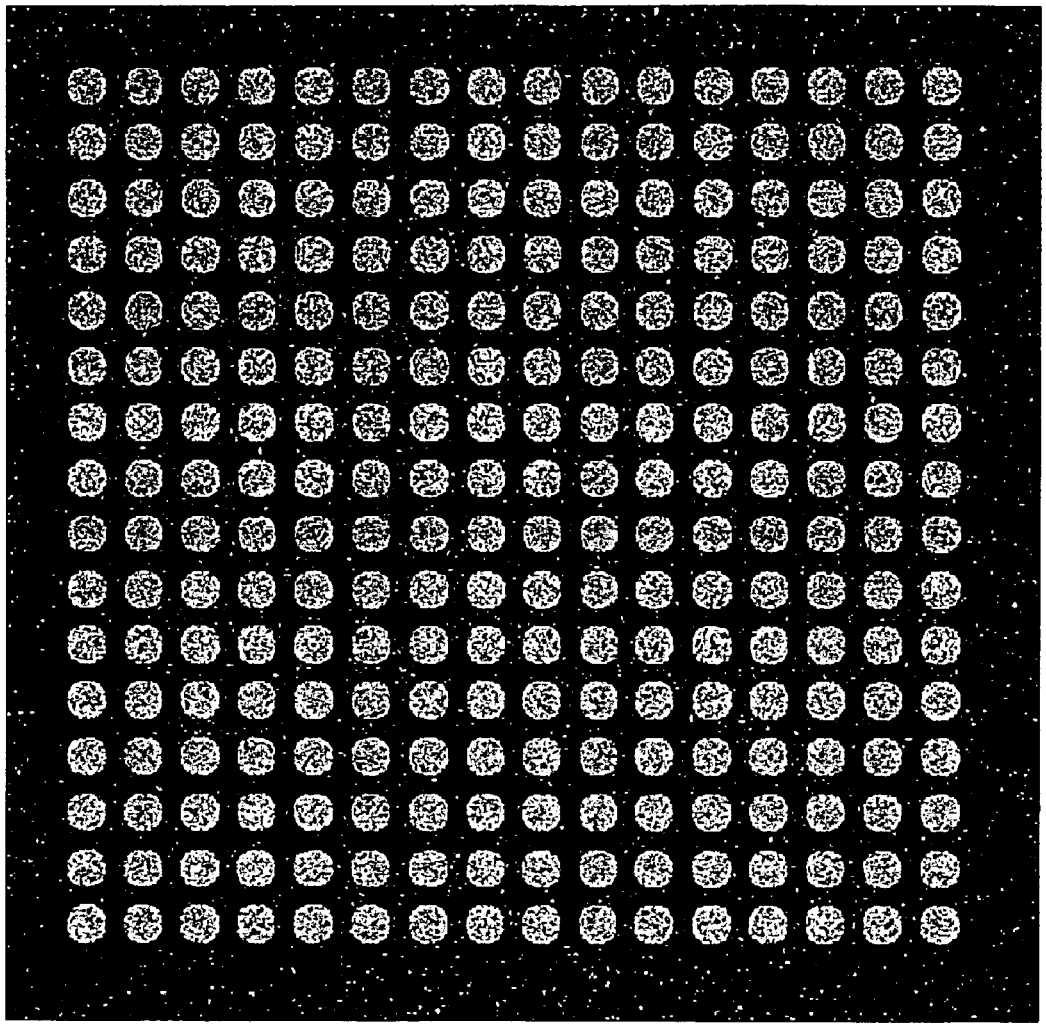
FIG. 2 is a simulated noisy image in 256 shades of gray, of the sort that might be captured by the scanning system of FIG. 1.
Figure 3:
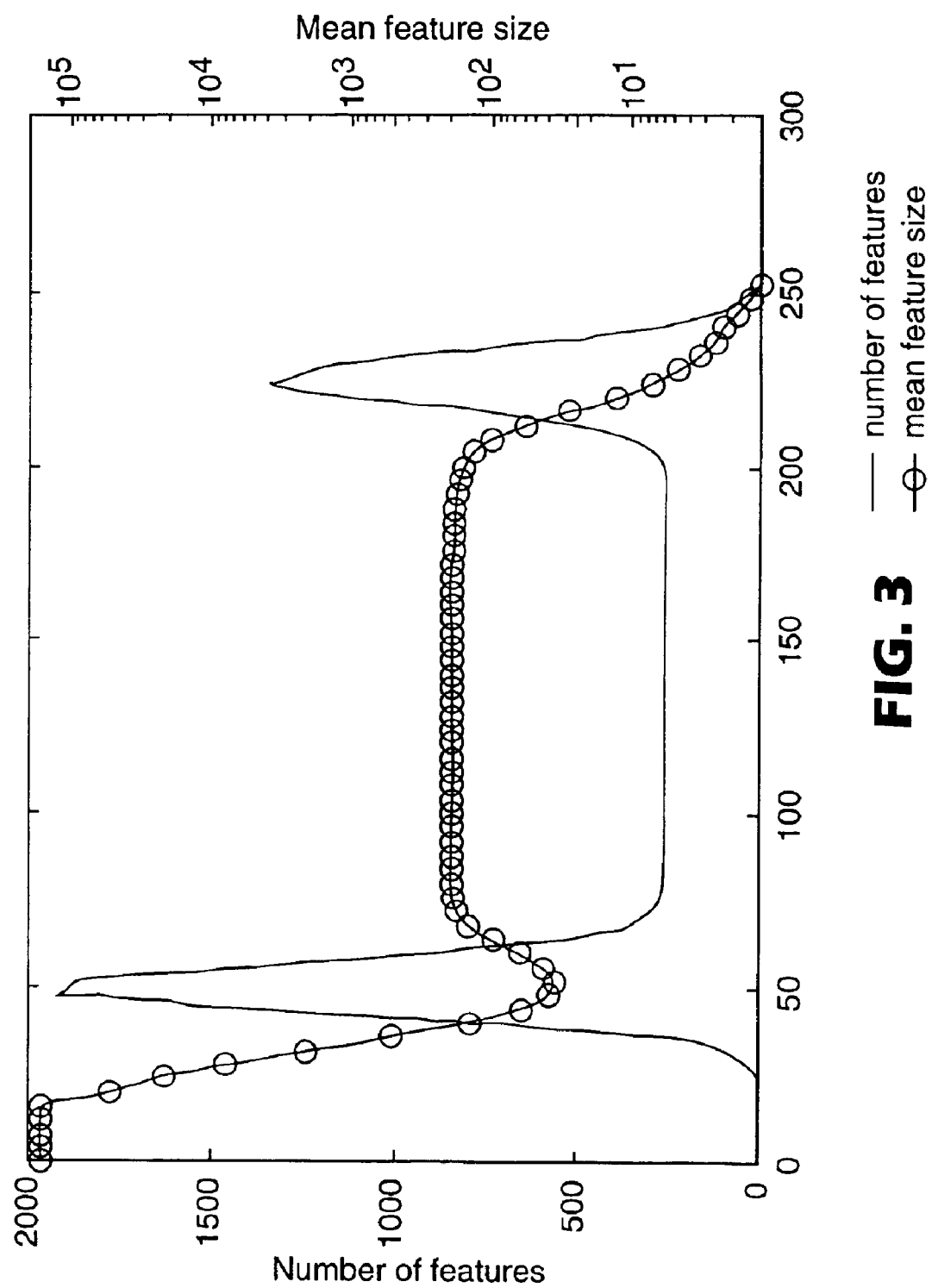
FIG. 3 is a graph showing number of detected features (N(t)) vs. detection level threshold (t) (left scale) and mean feature size (S(t)) vs. detection level threshold (t) (right scale) obtained for the noisy image of FIG. 2 according to the method of the present invention.

FIG. 3 includes a graph of mean feature size (S(t)) vs. detection level threshold (t) (right scale) obtained for the simulated noisy image of FIG. 2. Data for selected threshold levels appears in Table I.

TABLE I

| FIG. | Threshold level | Mean feature size (pixels) | Number of features |
|---|---|---|---|
| 4 | 35 | 697.5 | 176 |
| 5 | 50 | 35.1 | 1987 |
| 6 | 75 | 187.3 | 270 |
| 7 | 140 | 192.9 | 256 |
| 8 | 205 | 131.2 | 284 |
| 9 | 225 | 6.4 | 1341 |

Note that, for purposes of the present discussion and the present figures, features are represented as white images on a black background and lighter shades are represented by higher values of t. However, the opposite conventions may be employed by adjusting the terms as required, e.g., reversing "greater than" and "less than."

FIG. 3 and Table I also include a graph of counting data, plotted as number of detected features (N(t)) vs. detection level threshold (t) (left scale of FIG. 3), obtained by counting the number of features (N) appearing in the image at each of a plurality of threshold values (t). For the calculations reflected in FIG. 3, the test segment was the entire image, a "feature" was defined using the eight-connected rule, and calculations were made for every fourth value of t.

Figure 7:
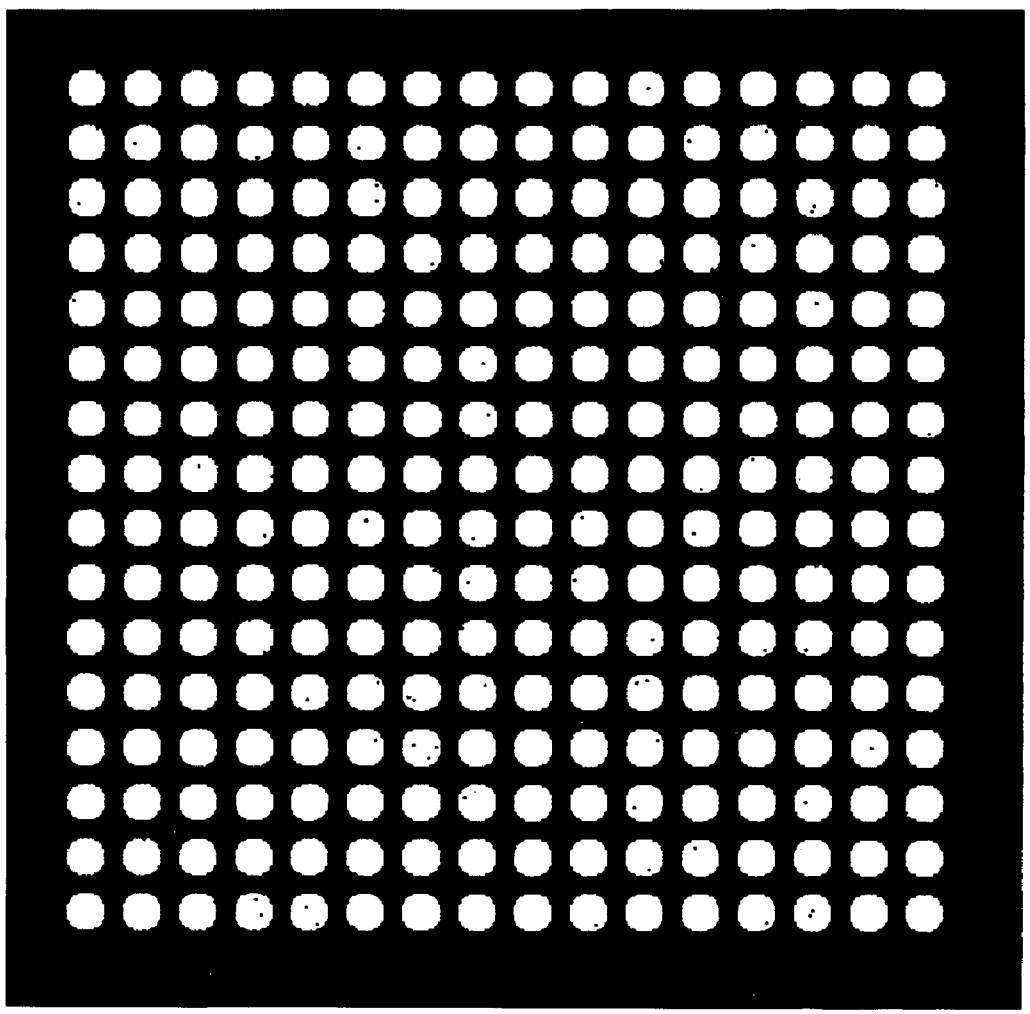
Figure 8:
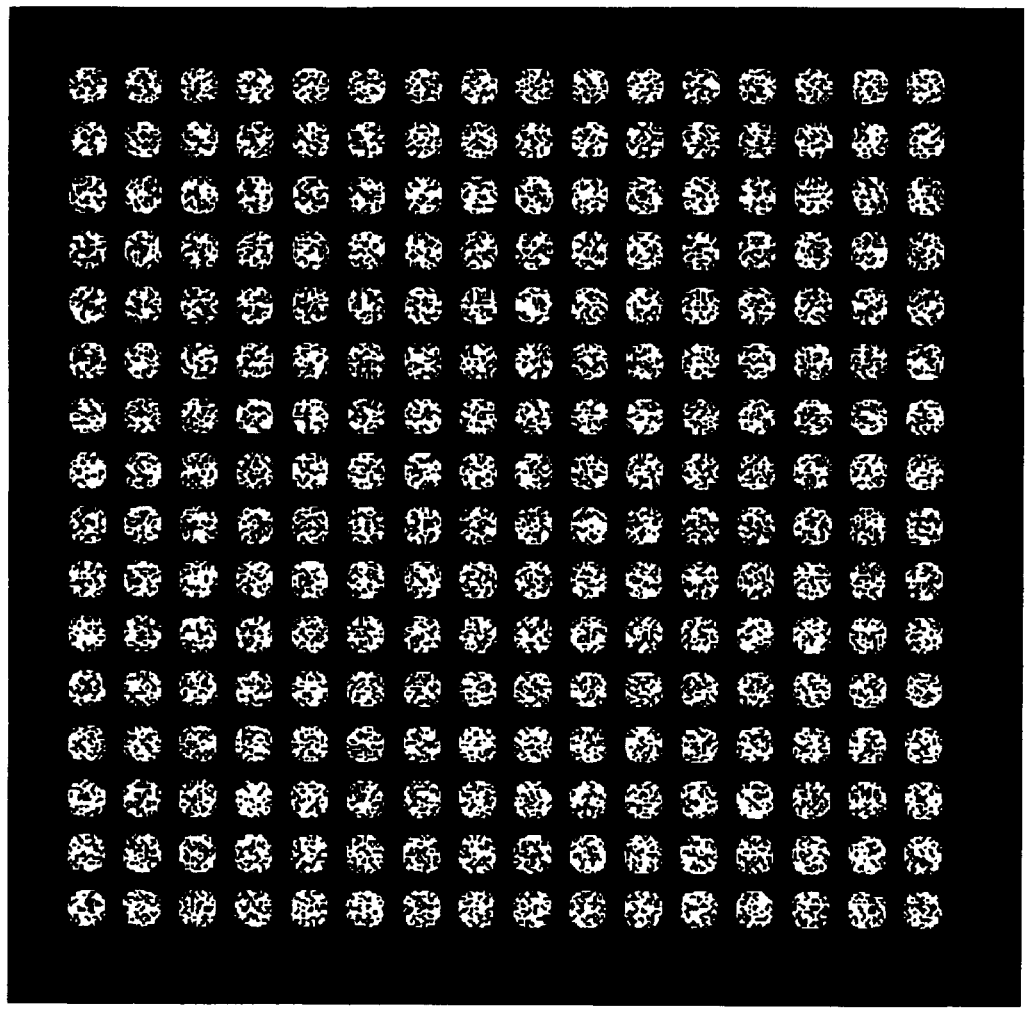
Figure 9:
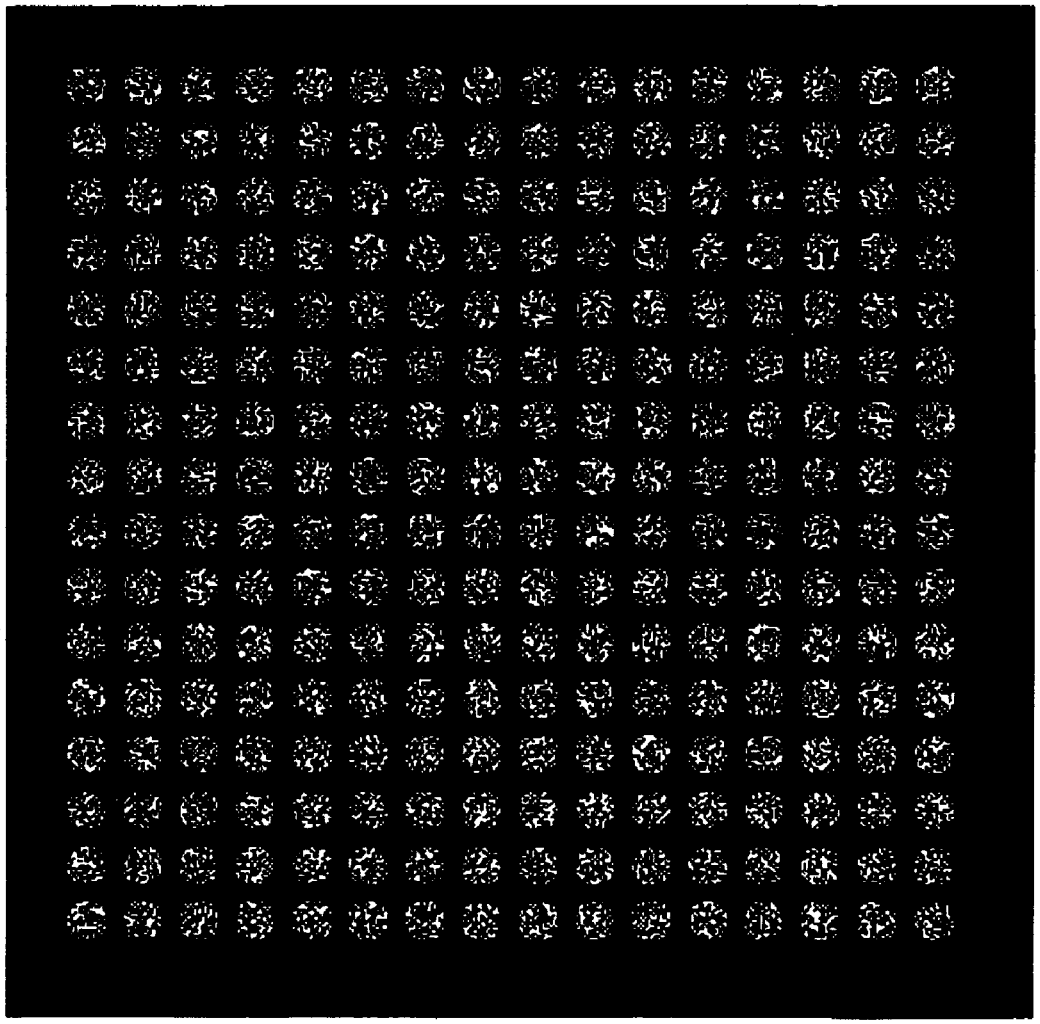

FIGS. 4–9 are binary images obtained by thresholding the noisy image of FIG. 2 at the following threshold levels: 35, 50, 75, 140, 205 and 225, as indicated in Table I. FIG. 7 was obtained by thresholding the noisy image at an optimal threshold value ($t_o$) determined according to the present invention, and represents a binary image product of the thresholding method according to the present invention.

Inspection of FIGS. 4–9 indicates that FIG. 7 represents the best defined and most noise-free binary image. Inspection of Table I indicates that the threshold associated with FIG. 7 appears at a shallow local minimum of N(t) (number of features) and at a shallow local maximum of S(t) (size of features). These observations are consistent with the minimal noise pixels observed in both the background and the feature areas. In contrast, FIG. 6 demonstrates noise pixels in the background areas and FIG. 8 demonstrates noise pixels in the feature areas.

Figure 4:
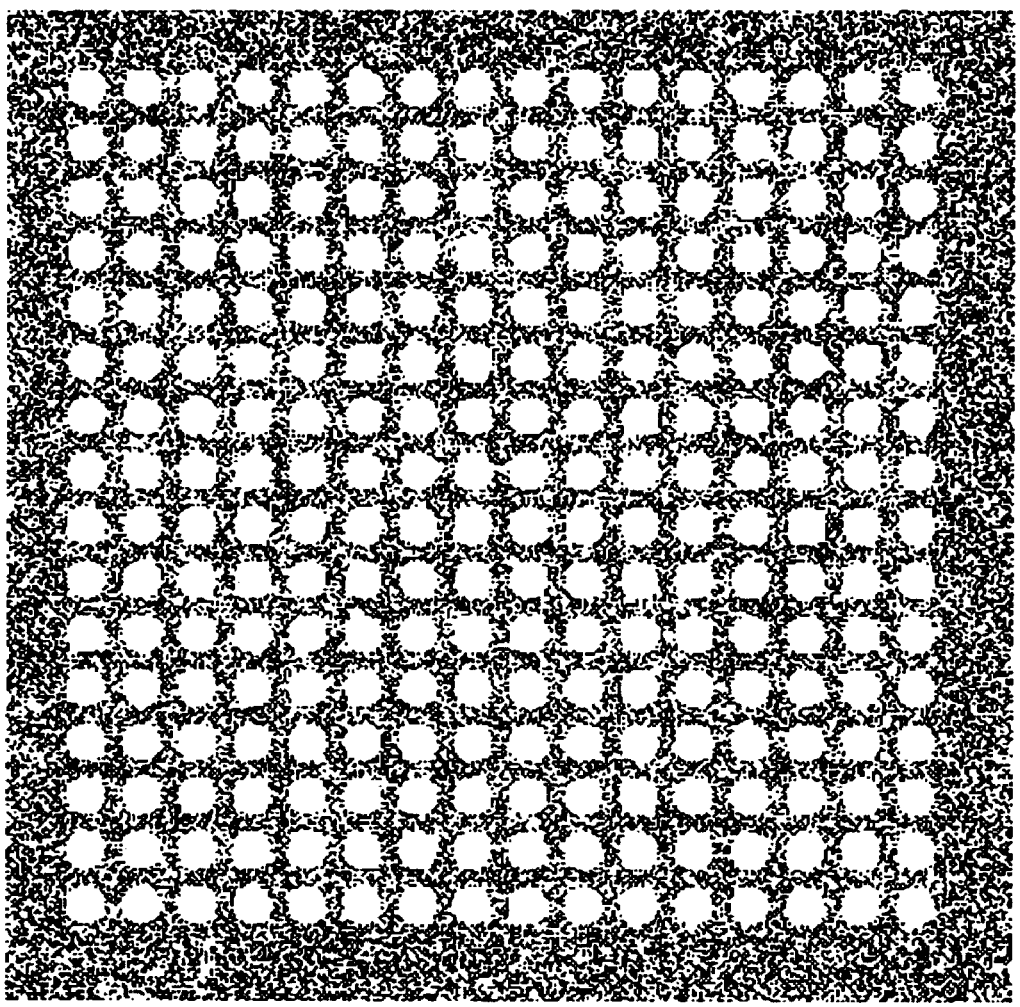
FIGS. 4–9 are binary images obtained by thresholding the noisy image of FIG. 2 at the following threshold levels: 35, 50, 75, 140, 205 and 225.
Figure 5:
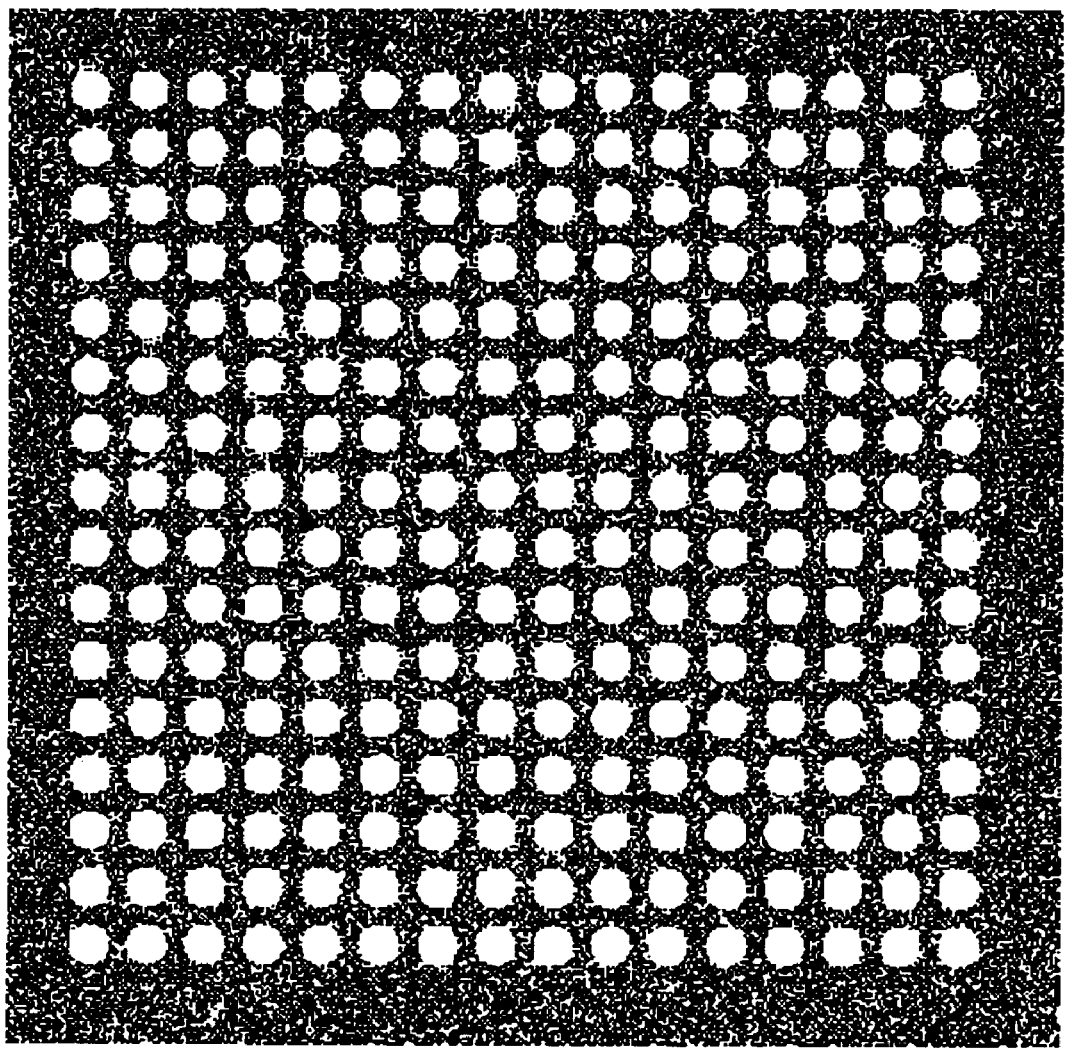
Figure 6:
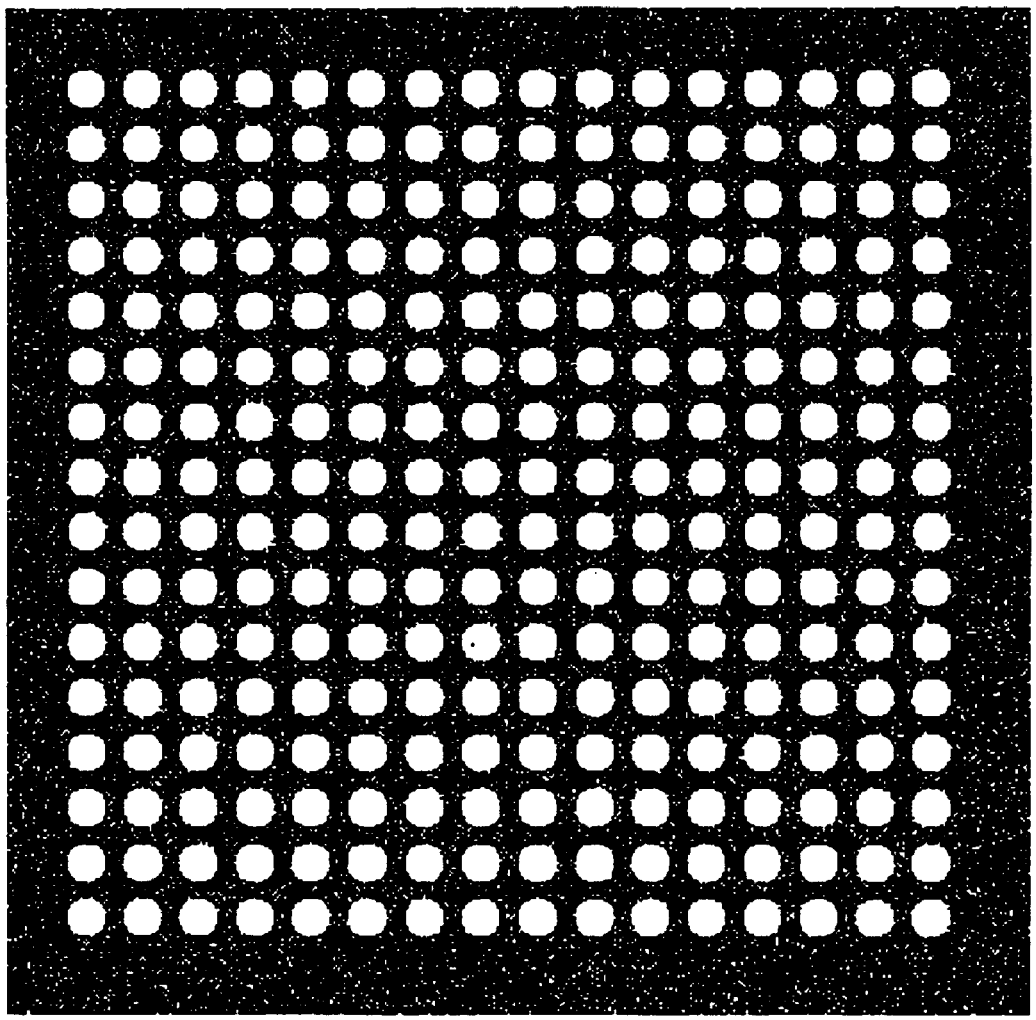

In the method according to the present invention, the optimal threshold value ($t_o$) is determined to be a threshold value equal to or approximating a midpoint of the plateau region of the mean feature size data, which occurs in FIG. 3 between t=75 and t=205. Typically, the optimal threshold value ($t_o$) is taken as the weighted average threshold value (t) appearing in the mean feature size data, weighted according to mean feature size (S(t)), after excluding the low threshold saturation plateau in the mean feature size data to obtain a relevant subset of the mean feature size data. The low threshold saturation plateau can be observed between t=0 and about t=50 in FIG. 3. FIGS. 3 and 4 demonstrate that the image is "washed out" at these low threshold values and the features are effectively joined to form one or few contiguous features, resulting in a very high mean feature size. The relevant subset may be obtained by excluding mean feature size data values (S(t)) for which S(t) is greater than a given percentage of the maximum value of S observed in the mean feature size data ($S_{max}$), which may be between 1% and 100% and is typically 1%. Typically, a percentage is selected that is somewhat greater than the ratio of the size of features expected in the test segment of the image to the size of the entire test segment of the image, since the size of the maximum value of S is expected to approach the size of the entire test segment of the image. Alternately, a fixed value of S(t) may be selected as a cutoff value to eliminate data in the low threshold saturation plateau.

More typically, a cutoff threshold value ($t_c$) is determined from the counting data (N(t)) and used to determine the relevant subset of the mean feature size data (S(t)). The relevant subset of the mean feature size data (S(t)) is selected by including all values for which $t > t_c$ or all values for which $t \geq t_c$. Typically, the cutoff threshold value ($t_c$) is determined as a function of the counting data (N(t)), which function determines a cutoff threshold value ($t_c$) that falls in a transition range between the early noise peak and the plateau region. Typically, the cutoff threshold value ($t_c$) is determined by a function $t_c = 2t_{P\%} - t_{Q\%}$; wherein $t_{P\%}$ is the lowest value of t for which N(t) has not exceeded P% of the maximum value of N observed in the counting data ($N_{max}$), wherein $t_{Q\%}$ is the lowest value of t for which N(t) has not exceeded Q% of the maximum value of N observed in the counting data ($N_{max}$), wherein P% ≥ Q%, and wherein P% and Q% are independently selected from numbers between 1% and 100%. More typically, P% is selected from numbers between 50% and 95% and Q% is selected from numbers between 5% and 95%. Most typically, P%=95% and Q%=50%.

After an optimal threshold value ($t_o$) for the image is determined, the image corresponding to thresholding at ($t_o$) may be output as data or as an image in any suitable manner, including visible displays or printing processes and also including further data transforming processes, such as use of the output image as a mask for further analysis of the original image input.

Typically, the present method is automated by use of computer technology to provide a system for choosing an optimal threshold value ($t_o$) for the image or for thresholding an image. The system may comprise: a) an image device for providing a digitized image; b) a data storage device; and c) a central processing unit for receiving the digitized image from the image device and which can write to and read from the data storage device. The present invention also encompasses data storage media having recorded thereon software that upon installation in a computer and execution of the software will cause the computer to carry out a method disclosed herein for choosing an optimal threshold value ($t_o$) for the image or for thresholding an image.

The present method may be extended to three dimensions. In the three-dimensional case, it will be understood that mean feature size refers to volume rather than area. Furthermore, higher dimensional images and data compilations might also be analyzed by use of the methods according to the present invention. As will be apparent, thresholding according to the method of the present invention might be used for noise elimination, decision making or pattern identification in multi-dimensional data space.

This invention is useful in the automated reading of optical information, particularly in the automated reading of a matrix of sample points on a tray, slide, or suchlike, which may be comprised in automated analytical processes like DNA detection or typing.

It will be understood that these exemplary embodiments in no way limit the scope of the invention. Steps in the thresholding process do not necessarily need to be performed strictly in the order described here; any order that accomplishes the same goals would work. Other modifications of the invention will be apparent to those skilled in the art in view of the foregoing description. These descriptions are intended to merely to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered. All publications and patents are herein incorporated by reference to the same extent as if each individual publication or patent was specifically and individually indicated to be incorporated by reference.

We claim:

1. A method of determining an optimal threshold value ($t_o$) for an image, said method comprising the steps of:
   a) obtaining an image;
   b) selecting a test segment of said image;
   c) determining the mean feature size (S) of features appearing in said test segment of said image at each of a plurality of threshold values (t), so as to produce mean feature size data (S(t));
   d) selecting a subset of the mean feature size data gathered in step c); and
   e) determining an optimal threshold value ($t_o$) as a function of said subset of mean feature size data;
wherein the step of selecting includes the steps of:
   f) counting the number of features (N) appearing in said test segment of said image at each of a plurality of threshold values (t), so as to produce counting data (N(t));
   h) determining a cutoff threshold value ($t_c$) as a function of said counting data (N(t)); and
   i) selecting a subset of the mean feature size data (S(t)) as a function of the cutoff threshold value ($t_c$).

2. The method according to claim 1, wherein said subset of the mean feature size data (S(t)) is selected by including all values for which $t \geq t_c$.

3. The method according to claim 1, wherein said subset of the mean feature size data (S(t)) is selected by including all values for which $t > t_c$.

4. The method according to claim 3, wherein, in step e), said function of said subset of mean feature size data yields a result equal to or approximating a midpoint of said subset of mean feature size data.

5. The method according to claim 3, wherein, in step e), said optimal threshold value ($t_o$) is taken as the weighted average threshold value (t) appearing in said subset of mean feature size data, weighted according to mean feature size (S(t)).

6. A method of thresholding an image comprising the method of claim 3, additionally comprising the step of:
   j) obtaining a binary image by thresholding said image by use of said optimal threshold value ($t_o$).

7. A method of thresholding an image comprising the method of claim 5, additionally comprising the step of:
   j) obtaining a binary image by thresholding said image by use of said optimal threshold value ($t_o$).

8. The method according to claim 1 wherein said cutoff threshold value ($t_c$) is determined as a function of said counting data (N(t)), wherein said function chooses a cutoff threshold value ($t_c$) that falls in a transition range between an early noise peak of said counting data (N(t)) and a following low-slope region.

9. The method according to claim 1 wherein said cutoff threshold value ($t_c$) is determined by a function $t_c = t_{p\%}$ wherein $t_{p\%}$ is the highest value of t for which N(t) has not exceeded P% of the maximum value of N observed in the counting data ($N_{max}$), wherein P% is selected from numbers between 1% and 100%.

10. The method according to claim 9 wherein P% is selected from numbers between 50% and 95%.

11. The method according to claim 1 wherein said cutoff threshold value ($t_c$) is determined by a function $t_c = 2t_{p\%} - t_{Q\%}$; wherein $t_{p\%}$ is the lowest value of t for which N(t) has not exceeded P% of the maximum value of N observed in the counting data ($N_{max}$), wherein $t_{Q\%}$ is the lowest value of t for which N(t) has not exceeded Q% of the maximum value of N observed in the counting data ($N_{max}$), wherein P% ≧ Q%, wherein P% and Q% are independently selected from numbers between 1% and 100%.

12. The method according to claim 11 wherein P% is selected from numbers between 50% and 95% and wherein Q% is selected from numbers between 5% and 95%.

13. The method according to claim 11 wherein P%=95% and Q%=50%.

14. The method according to claim 11, wherein said subset of the mean feature size data (S(t)) is selected by including all values for which $t \geq t_c$.

15. The method according to claim 11, wherein said subset of the mean feature size data (S(t)) is selected by including all values for which $t > t_c$.

16. The method according to claim 15, wherein, in step e), said function of said subset of mean feature size data yields a result equal to or approximating a midpoint of said subset of mean feature size data.

17. The method according to claim 15, wherein, in step e), said optimal threshold value ($t_o$) is taken as the weighted average threshold value (t) appearing in said subset of mean feature size data, weighted according to mean feature size (S(t)).

18. A method of thresholding an image comprising the method of claim 17, additionally comprising the step of:
   j) obtaining a binary image by thresholding said image by use of said optimal threshold value ($t_o$).

19. A method of thresholding an image comprising the method of claim 15, additionally comprising the step of:
   j) obtaining a binary image by thresholding said image by use of said optimal threshold value ($t_o$).

20. The method according to claim 11, wherein, in step e), said function of said subset of mean feature size data yields a result equal to or approximating a midpoint of said subset of mean feature size data.

21. The method according to claim 11, wherein, in step e), said optimal threshold value ($t_o$) is taken as the weighted average threshold value (t) appearing in said subset of mean feature size data, weighted according to mean feature size (S(t)).

22. A method of thresholding an image comprising the method of claim 11, additionally comprising the step of:
   j) obtaining a binary image by thresholding said image by use of said optimal threshold value ($t_o$).

23. The method according to claim 1, wherein, in step e), said function of said subset of mean feature size data yields a result equal to or approximating a midpoint of said subset of mean feature size data.

24. The method according to claim 1, wherein, in step e), said optimal threshold value ($t_o$) is taken as the weighted average threshold value (t) appearing in said subset of mean feature size data, weighted according to mean feature size (S(t)).

25. A method of thresholding an image comprising the method of claim 1, additionally comprising the step of:
   j) obtaining a binary image by thresholding said image by use of said optimal threshold value ($t_o$).

26. A system for determining an optimal threshold value ($t_o$) for an image comprising:

i) an image device for providing a digitized image;
ii) a data storage device; and
iii) a central processing unit for receiving the digitized image from the image device and which can write to and read from the data storage device, the central processing unit being programmed to:
   a) obtain an image;
   b) select a test segment of said image;
   c) determine the mean feature size (S) of features appearing in said test segment of said image at each of a plurality of threshold values (t), so as to produce mean feature size data (S(t));
   d) select a subset of the mean feature size data gathered in step c); and
   e) determine an optimal threshold value ($t_o$) as a function of said subset of mean feature size data;

wherein the step of selecting includes the steps of:
   f) count the number of features (N) appearing in said test segment of said image at each of a plurality of threshold values (t), so as to produce counting data (N(t));
   h) determine a cutoff threshold value ($t_c$) as a function of said counting data (N(t)); and
   i) select a subset of the mean feature size data (S(t)) as a function of the cutoff threshold value ($t_c$).

27. The system according to claim 26, wherein said subset of the mean feature size data (S(t)) is selected by including all values for which $t \geq t_c$.

28. The system according to claim 26, wherein said subset of the mean feature size data (S(t)) is selected by including all values for which $t > t_c$.

29. The system according to claim 28, wherein, in step e), said function of said subset or mean feature size data yields a result equal to or approximating a midpoint of said subset of mean feature size data.

30. The system according to claim 28, wherein, in step e), said optimal threshold value ($t_o$) is taken as the weighted average threshold value (t) appearing in said subset of mean feature size data, weighted according to mean feature size (S(t)).

31. A system of thresholding an image comprising the method of claim 28, wherein said central processing unit is additionally programmed to:
   j) obtain a binary image by thresholding said image by use of said optimal threshold value ($t_o$).

32. A system of thresholding an image comprising the method of claim 30, wherein said central processing unit is additionally programmed to:
   j) obtain a binary image by thresholding said image by use of said optimal threshold value ($t_o$).

33. The system according to claim 26 wherein said cutoff threshold value ($t_c$) is determined as a function of said counting data (N(t)), wherein said function chooses a cutoff threshold value ($t_c$) that falls in a transition range between an early noise peak of said counting data (N(t)) and a following low-slope region.

34. The system according to claim 26 wherein said cutoff threshold value ($t_c$) is determined by a function $t_c = t_{p\%}$ wherein $t_{p\%}$ is the highest value of t for which N(t) has not exceeded P% of the maximum value of N observed in the counting data ($N_{max}$), wherein P% is selected from numbers between 1% and 100%.

35. The system according to claim 34 wherein P% is selected from numbers between 50% and 95%.

36. The system according to claim 26 wherein said cutoff threshold value ($t_c$) is determined by a function $t_c = 2t_{p\%} - t_{Q\%}$; wherein $t_{p\%}$ is the lowest value of t for which N(t) has not exceeded P% of the maximum value of N observed in the counting data ($N_{max}$), wherein $t_{Q\%}$ is the lowest value of t for which N(t) has not exceeded Q% of the maximum value of N observed in the counting data ($N_{max}$), wherein $P\% \geq Q\%$, wherein P% and Q% are independently selected from numbers between 1% and 100%.

37. The system according to claim 36 wherein P% is selected from numbers between 50% and 95% and wherein Q% is selected from numbers between 5% and 95%.

38. The system according to claim 36 wherein P%=95% and Q%=50%.

39. The system according to claim 36, wherein said subset of the mean feature size data (S(t)) is selected by including all values for which $t \geq t_c$.

40. The system according to claim 36, wherein said subset of the mean feature size data (S(t)) is selected by including all values for which $t > t_c$.

41. The system according to claim 40, wherein, in step e), said function of said subset of mean feature size data yields a result equal to or approximating a midpoint of said subset of mean feature size data.

42. The system according to claim 40, wherein, in step e), said optimal threshold value ($t_o$) is taken as the weighted average threshold value (t) appearing in said subset of mean feature size data, weighted according to mean feature size (S(t)).

43. A system of thresholding an image comprising the method of claim 42, wherein said central processing unit is additionally programmed to:
   j) obtain a binary image by thresholding said image by use of said optimal threshold value ($t_o$).

44. A system of thresholding an image comprising the method of claim 40, wherein said central processing unit is additionally programmed to:
   j) obtain a binary image by thresholding said image by use of said optimal threshold value ($t_o$).

45. The system according to claim 36, wherein, in step e), said function of said subset of mean feature size data yields a result equal to or approximating a midpoint of said subset of mean feature size data.

46. The system according to claim 36, wherein, in step e), said optimal threshold value ($t_o$) is taken as the weighted average threshold value (t) appearing in said subset of mean feature size data, weighted according to mean feature size (S(t)).

47. A system of thresholding an image comprising the method of claim 36, wherein said central processing unit is additionally programmed to:
   j) obtain a binary image by thresholding said image by use of said optimal threshold value ($t_o$).

48. The system according to claim 26, wherein, in step e), said function of said subset of mean feature size data yields a result equal to or approximating a midpoint of said subset of mean feature size data.

49. The system according to claim 26, wherein, in step e), said optimal threshold value ($t_o$) is taken as the weighted average threshold value (t) appearing in said subset of mean feature size data, weighted according to mean feature size (S(t)).

50. A system of thresholding an image comprising the method of claim 26, wherein said central processing unit is additionally programmed to:
   j) obtain a binary image by thresholding said image by use of said optimal threshold value ($t_o$).

51. Data storage media having recorded thereon software that upon installation in a computer and execution of the sof tware will cause the computer to carry out a method of determining an optimal threshold value ($t_o$) for an image, said method comprising the steps of:

a) obtaining an image;

b) selecting a test segment of said image;

c) determining the mean feature size (S) of features appearing in said test segment of said image at each of a plurality of threshold values (t), so as to produce mean feature size data (S(t));

d) selecting a subset of the mean feature size data gathered in step c); and e) determining an optimal threshold value ($t_o$) as a function of said subset of mean feature size data;

wherein the step of selecting includes the steps of:

f) counting the number of features (N) appearing in said test segment of said image at each of a plurality of threshold values (t), so as to produce counting data (N(t));

h) determining a cutoff threshold value ($t_c$) as a function of said counting data (N(t)); and i) selecting a subset of the mean feature size data (S(t)) as a function of the cutoff threshold value ($t_c$).

52. The data storage media of claim 51, wherein said subset of the mean feature size data (S(t)) is selected by including all values for which $t \geq t_c$.

53. The data storage media of claim 51, wherein said subset of the mean feature size data (S(t)) is selected by including all values for which $t > t_c$.

54. The data storage media of claim 53, wherein, in step e), said function of said subset of mean feature size data yields a result equal to or approximating a midpoint of said subset of mean feature size data.

55. The data storage media of claim 53, wherein, in step e), said optimal threshold value ($t_o$) is taken as the weighted average threshold value (t) appearing in said subset of mean feature size data, weighted according to mean feature size (S(t)).

56. The data storage media of claim 53, wherein said method additionally comprises the step of:

j) obtaining a binary image by thresholding said image by use of said optimal threshold value ($t_o$).

57. The data storage media of claim 55, wherein said method additionally comprises the step of:

j) obtaining a binary image by thresholding said image by use of said optimal threshold value ($t_o$).

58. The data storage media of claim 51 wherein said cutoff threshold value ($t_c$) is determined as a function of said counting data (N(t)), wherein said function chooses a cutoff threshold value ($t_c$) that falls in a transition range between an early noise peak of said counting data (N(t)) and a following low-slope region.

59. The data storage media of claim 51 wherein said cutoff threshold value ($t_c$) is determined by a function $t_c = t_{P\%}$ wherein $t_{P\%}$ is the highest value of t for which N(t) has not exceeded P% of the maximum value of N observed in the counting data ($N_{max}$), wherein P% is selected from numbers between 1% and 100%.

60. The data storage media of claim 59 wherein P% is selected from numbers between 50% and 95%.

61. The data storage media of claim 51 wherein said cutoff threshold value ($t_c$) is determined by a function $t_c = 2t_{P\%} - t_{Q\%}$; wherein $t_{P\%}$ is the lowest value of t for which N(t) has not exceeded P% of the maximum value of N observed in the counting data ($N_{max}$), wherein $t_{Q\%}$ is the lowest value of t for which N(t) has not exceeded Q% of the maximum value of N observed in the counting data ($N_{max}$), wherein $P\% \geq Q\%$, wherein P% and Q% are independently selected from numbers between 1% and 100%.

62. The data storage media of claim 61 wherein P% is selected from numbers between 50% and 95% and wherein Q% is selected from numbers between 5% and 95%.

63. The data storage media of claim 61 wherein P%=95% and Q%=50%.

64. The data storage media of claim 61, wherein said subset of the mean feature size data (S(t)) is selected by including all values for which $t \geq t_c$.

65. The data storage media of claim 61, wherein said subset or the mean feature size data (S(t)) is selected by including all values for which $t > t_c$.

66. The data storage media of claim 65, wherein, in step e), said function of said subset of mean feature size data yields a result equal to or approximating a midpoint of said subset of mean feature size data.

67. The data storage media of claim 65, wherein, in step e), said optimal threshold value ($t_o$) is taken as the weighted average threshold value (t) appearing in said subset of mean feature size data, weighted according to mean feature size (S(t)).

68. The data storage media of claim 67, wherein said method additionally comprises the step of:

j) obtaining a binary image by thresholding said image by use of said optimal threshold value ($t_o$).

69. The data storage media of claim 65, wherein said method additionally comprises the step of:

j) obtaining a binary image by thresholding said image by use of said optimal threshold value ($t_o$).

70. The data storage media of claim 61, wherein, in step e), said function of said subset of mean feature size data yields a result equal to or approximating a midpoint of said subset of mean feature size data.

71. The data storage media of claim 61, wherein, in step e), said optimal threshold value ($t_o$) is taken as the weighted average threshold value (t) appearing in said subset of mean feature size data, weighted according to mean feature size (S(t)).

72. The data storage media of claim 61, wherein said method additionally comprises the step of:

j) obtaining a binary image by thresholding said image by use of said optimal threshold value ($t_o$).

73. The data storage media of claim 51, wherein, in step e), said function of said subset of mean feature size data yields a result equal to or approximating a midpoint of said subset of mean feature size data.

74. The data storage media of claim 51, wherein, in step e), said optimal threshold value ($t_o$) is taken as the weighted average threshold value (t) appearing in said subset of mean feature size data, weighted according to mean feature size (S(t)).

75. The data storage media of claim 51, wherein said method additionally comprises the step of:

j) obtaining a binary image by thresholding said image by use of said optimal threshold value ($t_o$).

* * * * *

UNITED STATES PATENT AND TRADEMARK OFFICE
CERTIFICATE OF CORRECTION

PATENT NO. : 6,961,476 B2 Page 1 of 1
APPLICATION NO. : 09/917545
DATED : November 1, 2005
INVENTOR(S) : Matthew R. C. Atkinson It is certified that error appears in the above-identified patent and that said Letters Patent is hereby corrected as shown below:

Column 3
Line 2, delete " comer " and insert -- corner -- therefore.

Column 8
Line 60, Claim 24; delete " $(t_c)$ " and insert -- $(t_o)$ -- therefore.

Column 9
Line 34, Claim 29; delete " or " and insert -- of -- therefore.

Column 10
Line 66, Claim 51; delete " sof tware " and insert -- software -- therefore.

Column 11
Line 55, Claim 59; delete " $(t_o)$ is " and insert -- $(t_c)$ is -- therefore.

Signed and Sealed this

Twenty-fourth Day of July, 2007

JON W. DUDAS
*Director of the United States Patent and Trademark Office*